United States Patent [19]

Cloud

[11] Patent Number: 6,128,082
[45] Date of Patent: Oct. 3, 2000

[54] TECHNIQUE AND APPARATUS FOR PERFORMING ELECTRONIC SPECKLE PATTERN INTERFEROMETRY

[75] Inventor: Gary L. Cloud, East Lansing, Mich.

[73] Assignee: Board of Trustees Operating Michigan State University, East Lansing, Mich.

[21] Appl. No.: 09/363,495

[22] Filed: Jul. 29, 1999

Related U.S. Application Data

[60] Provisional application No. 60/100,938, Sep. 18, 1998.

[51] Int. Cl.⁷ .................................................. G01B 9/02
[52] U.S. Cl. .................. 356/357; 356/345; 356/35.5; 356/347
[58] Field of Search .................................. 356/357, 345, 356/349, 347, 35.5

[56] References Cited

U.S. PATENT DOCUMENTS

| | | |
|---|---|---|
| 4,191,470 | 3/1980 | Butter . |
| 4,280,764 | 7/1981 | Sica, Jr. et al. . |
| 4,432,239 | 2/1984 | Bykov . |
| 4,850,693 | 7/1989 | Deason . |
| 4,887,899 | 12/1989 | Hung . |
| 5,004,345 | 4/1991 | Hung . |
| 5,313,265 | 5/1994 | Hayes et al. . |
| 5,506,672 | 4/1996 | Moslehi . |
| 5,508,801 | 4/1996 | Panin et al. . |
| 5,623,360 | 4/1997 | Gesell et al. . |
| 5,640,239 | 6/1997 | Takamiya et al. . |
| 5,666,197 | 9/1997 | Guerra . |
| 5,671,042 | 9/1997 | Sciammanella ......................... 356/347 |
| 6,040,900 | 3/2000 | Chen ...................................... 356/35.5 |

OTHER PUBLICATIONS

Gary Cloud, Optical Methods of Engineering Analysis, 1994—pp. 395–476.

*Primary Examiner*—Robert H. Kim
*Attorney, Agent, or Firm*—Harness, Dickey & Pierce, P.L.C.

[57] ABSTRACT

A speckle interferometer for measuring displacement deformation, motion or strain of an optically irregular surface of a specimen is disclosed. The interferometer includes laser, a spatial filter for receiving radiation from the laser and converting it into a spherical beam and projecting it to the optically irregular surface of the specimen is located. A reference plate located in or near the second location for reflecting or scattering some or all the radiation to a fourth location, said reflection interfering with the reflection from the optically irregular surface to form a pattern of speckles. A camera and imaging system for measuring displacement and changes in intensity of the speckles is also included.

13 Claims, 2 Drawing Sheets

TECHNIQUE AND APPARATUS FOR PERFORMING ELECTRONIC SPECKLE PATTERN INTERFEROMETRY

This application claims benefit of Provisional Application Ser. No. 60/100,938 filed Sep. 18, 1998.

BACKGROUND AND SUMMARY OF THE INVENTION

This invention relates to interferometry, and more particularly to a speckle interferometry apparatus and method that utilizes a scattering reference plate that can incorporate phase shifting.

Optical interferometers are known which make use of the interference phenomena known as the "speckle effect," the speckled pattern seen when laser light is used to illuminate a rough surface. This invention utilizes the speckle effect, but it offers significant cost and performance improvements over conventional apparatus and methods.

U.S. Pat. No. 4,850,693 teaches a compact and portable moiré interferometer for determining surface deformations of an object; and U.S. Pat. No. 4,794,550 teaches a method of extending the measurement range of the moiré reference beam techniques by constraining the reconstruction of a surface contour based on a prior knowledge about the surface. These moire methods require that some form of a grating be created or projected onto the surface of the specimen, perhaps by the use of coherent laser light.

The physics of this invention are distinctly different from moire techniques. This invention measures deformations, displacements, and strains of an object, but it does not employ the "moire effect," in that no grating is created on the specimen or in the optical system. Only the "speckle effect" is used.

Speckle interferometry is known for use in measuring strain in structural members and mechanical components. U.S. Pat. No. 4,591,996 teaches a method and apparatus for measuring strain in structural members utilizing a laser beam to illuminate a surface being analyzed and an optical data digitizer to sense a signal provided by the light beam reflected from the illuminated surface. The optical data digitizer is used to compare the signal received from the surface in a reference condition to subsequent signals received from the surface after surface deformation.

As is known in the art, data from the interference speckle can be used in several ways. While the specimen is stretched, the speckles translate indicating in-plane displacement and also vary in intensity indicating out-of-plane displacement. Due to the nature of materials, it can be assumed that changes from one speckle to an adjacent one are small and therefore linear. Because of this, contour maps of displacements and strains, both in-plane and out-of-plane can be constructed. The mathematical theorems and explanations of the recombination of object and reference beams are known in the art and are further described in a publication of the inventor, *Optical Methods of Engineering Analysis,* Cambridge University Press 1995, Gary Cloud, which is expressly incorporated herein by reference.

The speckle is itself an interference phenomenon. The formation of speckles in imaging systems can be described at any image region as the superimposition result of the coherent point spread functions for adjacent object points. The speckle created by imaging optics is referred to as a "subjective" speckle. The nature of the illuminated surface gives rise to two different classes of speckle patterns. One class is called the "fully developed" speckle pattern; it develops only from interference of light that is all polarized in the same manner. The speckle field itself will then be similarly polarized. Surfaces at which polarized light is singly scattered, such as matte finished metal, generally give rise to polarized speckle fields as do lightly scattering transmission elements such as ground glass. Matte white paint surfaces or opal glass, into which the light penetrates and is multiply scattered, depolarize the light and thus do not generate a fully developed speckle pattern. The brightness distributions of the two classes of speckle patterns differ substantially, but this difference is not important in the functioning of speckle interferometry systems.

The current invention requires the mixing of two speckle patterns, from two different scattering surfaces. When this occurs, the size of the speckles does not change appreciably, but their brightness distribution might be altered, depending on whether the patterns are mixed coherently or not (in this case coherently mixed). For the case in which the two original speckle fields are brought together coherently, the result is a third speckle pattern, differing only in detail from its two component patterns but whose size and statistical brightness distribution remain unchanged. This third speckle pattern is used in measuring motion, deformation, or strain of one of the reference surfaces.

Several different scattering surfaces are provided in the current invention. In the first, a reference surface is provided which is positioned adjacent to the surface of the specimen or surrounding the specimen. The reference surface and the specimen surface are illuminated by a beam of coherent light which has been passed through a spatial filter. The mixed speckle patterns scattered or reflected from these surfaces are recorded by the imaging system. The specimen is then subjected to a load, which causes displacement of the object's surface. This displacement causes a change in location and intensity of the various speckles in the mixed pattern. The changed patterns are again recorded by the imaging system. A computer connected to the camera captures the images and calculates displacements or strains on the object's surface.

In another embodiment of the current invention, a plate of at least partially transparent material is positioned between the laser illuminating source and the surface of the specimen. A portion of the light travels through the partially transparent reference and is scattered or reflected from the surface of the specimen. The mixed speckle patterns from the reflection off the transparent reference plate and the surface of the specimen are captured by the imaging system.

Optionally, any or all of the reference plates can be coupled to a system that translates the reference surfaces. As will be further described herein, the translation of the reference plate can be used to calculate the displacements of the surface of the specimen.

The disclosed speckle interferometry system is very good at measuring both in-plane and out-of-plane displacements. The processing of the data differs, however, depending on the displacement component sought. As the specimen is translated out of the plane of the specimen, the path lengths for the waves scattered from within a resolution element will change, causing a change of relative phase or intensity of a given speckle. As the specimen is translated in its plane, the speckle pattern is translated.

By including a capability which allows for the translation of one of the different scattering surfaces, the process known as "phase shifting interferometry" or "phase stepping interferometry" can be implemented with this invention. In this case, the scattering surface or reference plate is translated so as to determine the relative phase of a given speckle. This allows the imaging system to take brightness data for a given speckle and translate it to data that corresponds to out-of-plane displacement of the surface of the specimen. The system then uses the translation of the speckle pattern to precisely calculate the in-plane translation of the specimen surface. As such, the current system provides an efficient non-contacting system that can measure both in-plane and out-of-plane displacements and hence strains of the surface of a specimen.

As such, it is an object of this invention to provide a method and apparatus for measurement of deformations, displacements, and strains of the surface of structures of all kinds.

It is further an object of the present invention to measure the relative magnitude of displacements from an original position on different points on a surface of an object under stress.

It is yet another object of the present invention to provide an improved interferometry apparatus and technique for performing electronic speckle pattern interferometry in the analysis of motion, strain, and deformations of all kinds of structures, components, bodies and materials.

It is yet another object of the present invention to provide an interferometry apparatus which will be useful in the areas of engineering, manufacturing, medicine and natural science for making precise measurements without the necessity of heavy investment in equipment.

It is yet another object of the present invention to provide an interferometry apparatus using what is known as digital speckle pattern interferometry (DSPI) and video holography—video holographic interferometry (VHI). The apparatus is greatly simplified in comparison with traditional setups, and makes the method much more resistant to vibration and other sources of noise which tend to contaminate the results of DSPI.

It is yet another object of the present invention to provide an interferometry apparatus and method which maintains an excellent bandwidth characteristic of the traditional speckle interferometry approach.

It is yet another object of the present invention to provide an interferometry apparatus utilizing the speckle effect having a reference plate disposed before the specimen. The speckle interferometer includes a laser, a spatial filter/expander, a reference surface, a phase shifter, and recording media. Fringes occur upon making a pair of exposures of the interference patterns made before and after deformation of a rough surface. The relative magnitude of the displacements from the original position at different points on the surface can be determined from the position of the fringes. Alternatively, if phase shifting or phase stepping is used, then three or more images of the specimen are captured before and after loading, each image being taken at a different phase shift. The displacements are computed directly from the brightness data and may or may not be displayed as "fringes," displacement maps, or strain maps depending on application.

The foregoing as well as other objects, features and advantages of the present invention will become more apparent from the following detailed description when taken in conjunction with the appended drawings.

DETAILED DESCRIPTION OF THE INVENTION

In general, the improvement taught by this invention, is to force ESPI, which is typically based on a Michelson interferometer configuration, to approximate a common path interferometer, while maintaining the positive features of the Michelson interferometer method.

The major key to the success of this approach is the incorporation of the splitter or reference plate which is placed close to the specimen. The plate serves to split off the reference beam from the main illumination or object beam close to the specimen. The only part of the optical path which is not "common path" is the small space between the reference plate and the specimen. In the configuration shown, interference fringes indicating displacements along the line of sight are obtained without further additions. The system can be modified to obtain other displacement components for many applications such as NDI.

Figure 1:
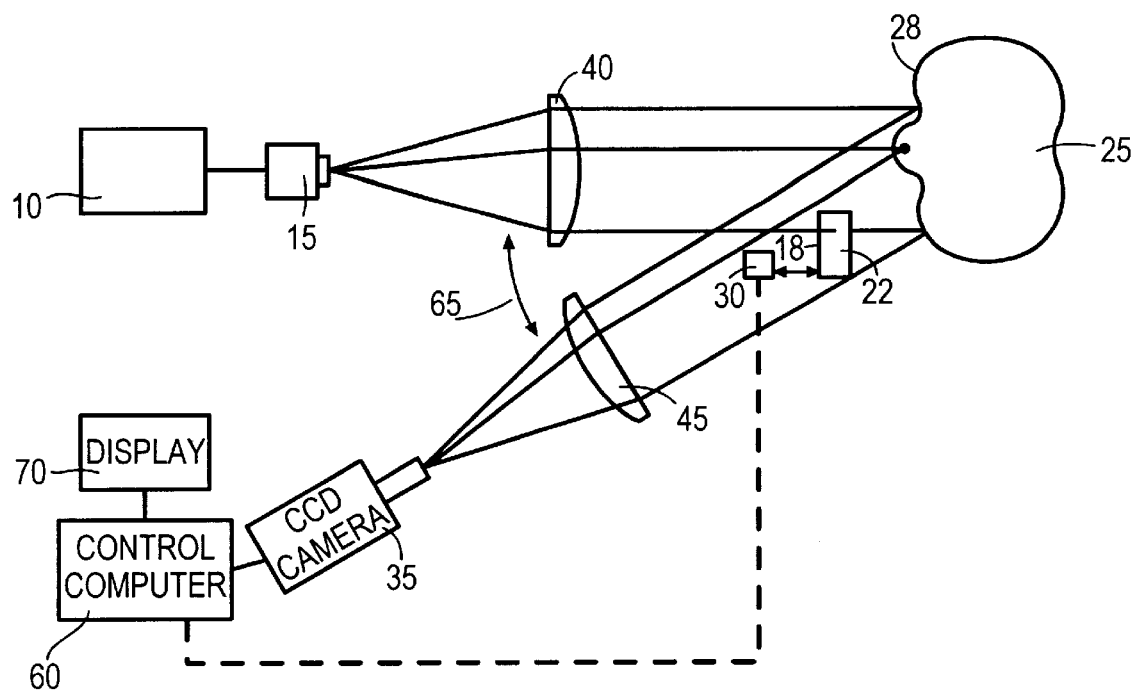
FIG. 1 is a schematic diagram of the apparatus of the invention.

Referring to FIG. 1, the apparatus for studying the deformation of the surface 28 of a specimen 25 under stress includes a monochromatic laser source 10 which illuminates the surface 28 of the specimen 25 through a spatial filter/expander 15 and an optional collimating lens 40. The surface 28 is assumed to be optically rough and therefore produce a speckle pattern when it is illuminated by the laser light. As such, surface 28 is shown to be irregular. Some of the light scattered by the surface 28 enters an optional field lens 45 to provide the input beam to the video camera 35. Further, the mono-chromatic laser source 10 illuminates through the spatial filter 15 the surface 18 of the reference plate 22. The spatial filter 15 converts the beam from the mono-chromatic laser source 10 into a spherical beam of light. The laser source 10 can be a standard HeNe laser, an ion laser, compact solid-state laser, or a laser diode. The reference plate 22 can be made of a partial mirror, a plain piece of glass, or glass that is etched to provide a partial scattering surface; or, finally, the reference plate can be opaque with a rough surface. The reference plate 22 does not need to be flat, especially if the plate 22 is unable to reflect speckles.

The reference plate 22 having front surface 18 can be placed close to the area of study so that it does not occlude the study area, but in a location so that it is illuminated by the laser beam. Some of the light scattered by the surface 18 impinges again onto the optional field lens 45 and into the video camera 35. The speckled patterns produced by the two beams are allowed to interfere to produce a resulting speckled image of the object surface 28. The two beams are combined and are recorded through a CCD camera 35. One skilled in the art will appreciate that other imaging systems utilizing traditional film cameras or video equipment are usable and equivalent.

The optical signals from surface 28 of object 25 are received by the camera 35 and transmitted to a signal extraction and processing module comprising analog to digital (A/D) and digital to analog (D/A) modules. The module converts the signal produced by the camera into a digital form, or the output of the system from digital to analog form. Other components of the system include an arithmetic logic unit, which performs arithmetic and logical operations, storage memories or frame buffers for storage of information during data extraction and processing, an array processor for performing certain operations needed during data extractions and processing with high efficiency, a computer for controlling the different components and performing some of the operations during data processing, and a video monitor for graphically depicting the output of the system.

In traditional speckle interferometry, the lack of a common path between the reference and specimen beams leads to significant errors or loss of data when vibrations, thermal gradients, or noise are present. This problem has greatly hampered use and acceptance of the powerful DSPI methods in factory and field environments. One primary benefit of the current system is that the reference and object beams travel almost identical paths, so that the advantages of common path interferometry is gained while retaining the advantages of DSPI. As such, the reference plate 22 should be as close to the specimen 25 as possible. This almost-common-path system significantly reduces the effect of vibration in the system and reduces the necessity for vibrational isolation of the specimen 25 or other components.

For the most precise measurements, the common techniques of "phase shifting" or "phase stepping" can be incorporated in a simple way. This is accomplished by simply translating the splitter plate along the line of illumination by use of a mechanical or piezoelectric driver which is coupled to the control computer 60. The measurement results can then be presented on a suitable display 70.

Phase shifter 30 is mechanically coupled to reference plate 22. By using the phase shifter 30 to move the reference plate 22 prior to and after the loading of the specimen 25, a contour map of the displacements of the object 25 can be produced. See *Optical Methods of Engineering Analysis,* previously incorporated herein by reference. The use of the reference plane 22 with no phase shifter in the system allows for the formation of a map of interference fringes representing changes of contour of the object.

Shown in FIGS. 1–4 is the angle theta 65. It should be noted that for convenience the angle theta is large in the diagrams, but in practice the angle theta 65 should be small to minimize errors. This is true for all embodiments of the invention.

Figure 2:
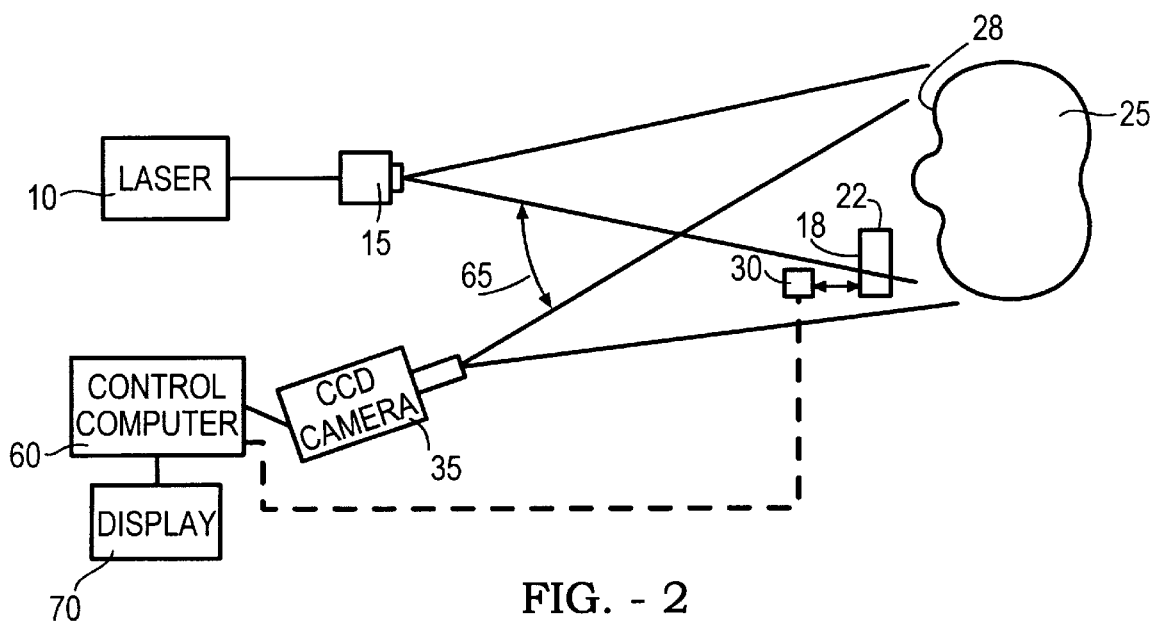
FIG. 2 is a schematic diagram of an alternate embodiment of the invention.

FIG. 2 depicts an alternate embodiment of the current invention. Mono-chromatic laser 10 projects a beam through spatial filter/expander 15 onto the specimen 25 having a reference surface 28. The spatial filter 15 further projects the laser beam on to the surface 18 of reference 22. The light scattered by the surface 28 of specimen 25 and surface 18 of reference plate 22 produces a speckle pattern as was described above. The speckled image is captured by video camera 35 and is downloaded through a frame grabber to computer 60.

Figure 3:
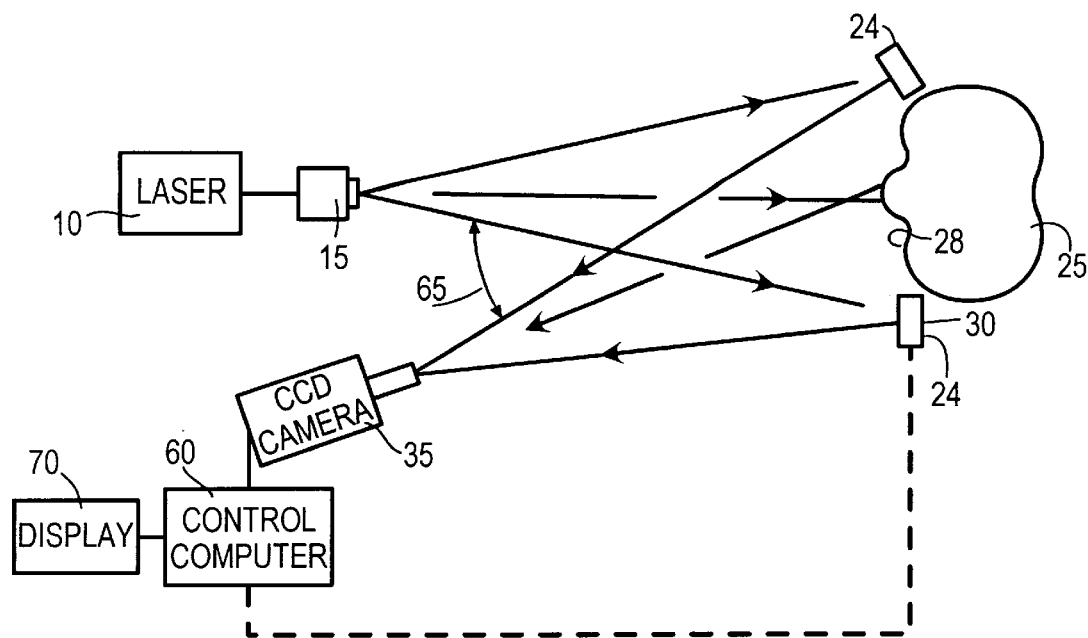
FIG. 3 is further an alternate embodiment of the invention having a ring reflective plate.

FIG. 3 shows an alternate embodiment for the current invention. The reference plate 24 is in the form of an annular plate that is open in the center. This reference or reflecting plate 24 is used to "frame" the view of the specimen 28 being observed. An advantage of this plate when incorporated into a system is to provide a means to enclose the system while providing a large reflective reference surface. The plate 24 can be further coupled to a phase shifter 30.

Figure 4:
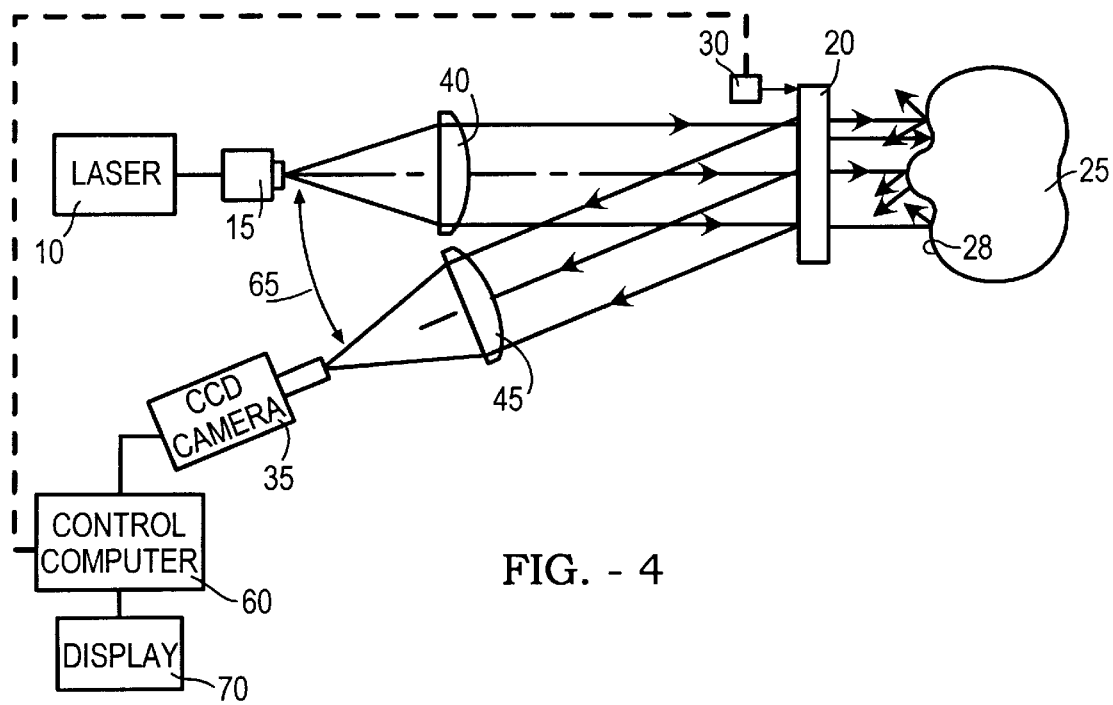
FIG. 4 is an alternate embodiment of the invention having a translucent reference plate.

FIG. 4 shows yet another embodiment of the current invention. The laser 10 projects a beam through a spatial filter/expander 15 and further through the optional collimator lens 40. Disposed between the collimator lens 40 and the specimen 25 is a splitter or reference plate 20. Mechanically coupled to the splitter or reference plate 20 is a phase shifter 30. The collimated beam is divided into two components. The first or object beam is projected on to the surface 28 of specimen 25. The second component or reference beam is reflected off of the splitter or reference plate 20 and through the optional field lens 45 to video camera 35. The object beam is reflected from the specimen surface 28 and travels back through the splitter or reference plate and through the optional field lens 45 into video camera 35. In this embodiment, the noted feature is that the splitter or reference plate 20 are directly in the path of the optionally collimated beam of light. As previously mentioned, the video signal from camera 35 is captured by frame grabber and processed in computer 60.

The preferred method for the use of the speckle interferometer as previously described is as follows. The laser 10, via the interferometric apparatus, illuminates the specimen 25. An image of the specimen and corresponding speckle pattern is captured by the video camera 35 and processed by the computer 60. While the specimen 25 is being simultaneously illuminated by the laser 10 and observed by the video camera 35, the specimen 25 is subjected to a load. Changes in the speckle pattern caused by slight movements of the specimen surface 28 are recorded by the video camera 35 and processed by the computer 60. Again, the measurement and analysis results can be presented on a connected display 70.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A speckle interferometer for measuring displacement deformation, motion or strain of an optically irregular surface of a specimen comprising:

a radiation source for producing a beam of coherent radiation to a first location;

a spatial filter located at the first location for receiving the radiation from the radiation source and converting it into a spherical beam and projecting it to a second location wherein the optically irregular surface of the specimen is located at the third location for reflecting the radiation to a fourth location, said reflection forming speckles which move and change brightness proportionally to the movement of the optically irregular surface;

a reference plate located in or near the second location for reflecting or scattering some or all the radiation to a fourth location, said reflection interfering with the reflection from the optically irregular surface to form a pattern of speckles;

a camera for receiving the radiation from the fourth location and recording information relating to the speckles; and an imaging system for measuring displacement and changes in intensity of the speckles.

2. The speckle interferometer of claim 1 further including a phase shifter mechanically coupled to the reference plate for translating the reference plate a pre-determined amount; a controller connected to the camera and to the plate shifter.

3. The speckle interferometer of claim 1 wherein the reference surface is opaque.

4. The speckle interferometer of claim 1 wherein the reference plate is partially transparent and is optically disposed between the second and third location.

5. The speckle interferometer of claim 1 wherein the reference plate is a transparent plate disposed between the second and third location.

6. The speckle interferometer of claim 1 wherein the reference plate is optically disposed between the third and fourth location.

7. The speckle interferometer of claim 3 wherein the reference plate is disposed adjacent the optically irregular surface.

8. A speckle interferometer for measuring displacement, deformation, or strain of an optically irregular surface of a specimen comprising:

a radiation source for producing a beam of coherent radiation to a first location;

a spatial filter located at the first location for receiving the radiation from the radiation source and converting it into a spherical beam and reflecting to a second location;

a collimator located in the second location for receiving the radiation from the spatial filter and collimating and reflecting the radiation to a third location;

wherein the optically irregular surface of the specimen is located at the third location for reflecting the radiation to a fourth location, the reflected radiation forming speckles which move and change brightness proportional to movement of the surface;

an optical element located at the fourth location for receiving the reflected beam from the fourth location and reflecting it to a fifth location; and an imaging system located in the fifth location for recording the location and changes in intensity of the speckles.

9. The speckle interferometer of claim 8 wherein the reference plate is opaque.

10. The speckle interferometer of claim 8 wherein the reference plate is a glass plate optically disposed between the second location and the third location.

11. A method of determining the displacement, deformation, or strain of a surface of a specimen comprising the steps of:

providing a radiation source, which produces a beam at coherent radiation;

providing a specimen having a first optically irregular reflective surface;

provide an imaging system for recording and processing images;

providing a reference plate having a second optically irregular reflective surface;

illuminating the first and second surfaces with the beam of coherent radiation, such that the beam of coherent radiation reflects off of the surfaces to produce speckles;

recording a first image of the speckles;

applying a load to the specimen;

recording a second image of the speckles; and processing the images.

12. The method of claim 11 further comprising the steps of:

providing a first spatial filter within the beam of coherent radiation to disperse the beam.

13. The method of claim 11 further comprising the steps of:

providing a reference phase shifter for translating the second optically irregular surface;

translating the second optically irregular surface by certain amounts and recording additional images of the speckles.

* * * * *